United States Patent [19]

Fencl et al.

[11] 4,187,406
[45] Feb. 5, 1980

[54] MACHINE FOR WELDING SEAMS IN AUTOMOTIVE WHEEL RIM BLANKS

[75] Inventors: Vernon R. Fencl, Northbrook; Aujit Tan, Chicago, both of Ill.

[73] Assignee: Grotnes Machine Works, Inc., Chicago, Ill.

[21] Appl. No.: 920,075

[22] Filed: Jun. 28, 1978

Related U.S. Application Data

[63] Continuation-in-part of Ser. No. 722,428, Sep. 13, 1976, abandoned.

[51] Int. Cl.² .............................................. B23K 11/02
[52] U.S. Cl. ................................. 219/59.1; 219/61.1; 219/61.13
[58] Field of Search ............................. 29/159.1, 802; 219/59.1, 57, 60 A, 61.2, 64, 61.13, 101, 104, 158, 160, 161; 228/44.1 R, 44.5; 269/266

[56] References Cited

U.S. PATENT DOCUMENTS

| | | | |
|---|---|---|---|
| 428,617 | 5/1890 | Lemp | 219/101 |
| 475,667 | 5/1892 | Coffin | 219/101 |
| 924,868 | 6/1909 | Winfield et al. | 219/101 |
| 2,204,858 | 6/1940 | Hudson | 219/101 |
| 2,454,948 | 11/1948 | Seltzer | 219/101 |
| 2,623,973 | 12/1952 | Malke | 219/101 |
| 2,713,626 | 7/1955 | Lewis | 219/101 |
| 3,209,116 | 9/1965 | Rudd | 219/61.2 |
| 3,209,116 | 9/1965 | Rudd | 219/59 |
| 3,562,473 | 2/1971 | Cavagnero | 219/160 |
| 3,668,359 | 6/1972 | Emerson | 228/44.1 R |
| 3,684,149 | 8/1972 | Ambler | 228/44.1 R |
| 3,951,395 | 4/1976 | Hennenfent et al. | 228/44.1 R |

FOREIGN PATENT DOCUMENTS

| | | | |
|---|---|---|---|
| 1343904 | 10/1963 | France . | |
| 18-11533 | 5/1943 | Japan . | |
| 1128412 | 9/1968 | United Kingdom | 219/59.1 |
| 1314705 | 4/1973 | United Kingdom . | |
| 145287 | 3/1961 | U.S.S.R. . | |
| 240888 | 4/1967 | U.S.S.R. . | |
| 284208 | 8/1969 | U.S.S.R. . | |

*Primary Examiner*—Bruce A. Reynolds
*Assistant Examiner*—M. H. Paschall
*Attorney, Agent, or Firm*—Leydig, Voit, Osann, Mayer & Holt, Ltd.

[57] ABSTRACT

A welding machine for welding the longitudinal seams in wheel rim blanks which have been rolled into cylinders with the longitudinal edges of each blank forming a longitudinal gap includes a pair of clamping assemblies each having an inside member and an outside member for engaging the inner and outer surfaces, respectively, of the rim blank adjacent the longitudinal edges thereof on opposite sides of the longitudinal gap so as to align the longitudinal edges with each other. At least one of the clamping assemblies is movable relative to the other clamping assembly in a direction transverse to the longitudinal gap so as to permit the longitudinal edges of the rim blank to be pressed against each other. The longitudinal edges of the blank are pressed together in the transverse direction to close the gap and hold the longitudinal edges together during the welding thereof. An electric welding current is passed transversely through the longitudinal edges of the blank while continuously pressing the edges together and while continuously clamping the rim blank on both sides of the gap to maintain the edges in alignment with each other. The electric welding current is supplied to the rim blank through the outside clamping members so that the welding current flows perpendicularly through the weld line. Both the inner and outer clamping members of at least one of the clamping assemblies are supported on bearings to permit sliding movement of these clamping members.

16 Claims, 13 Drawing Figures

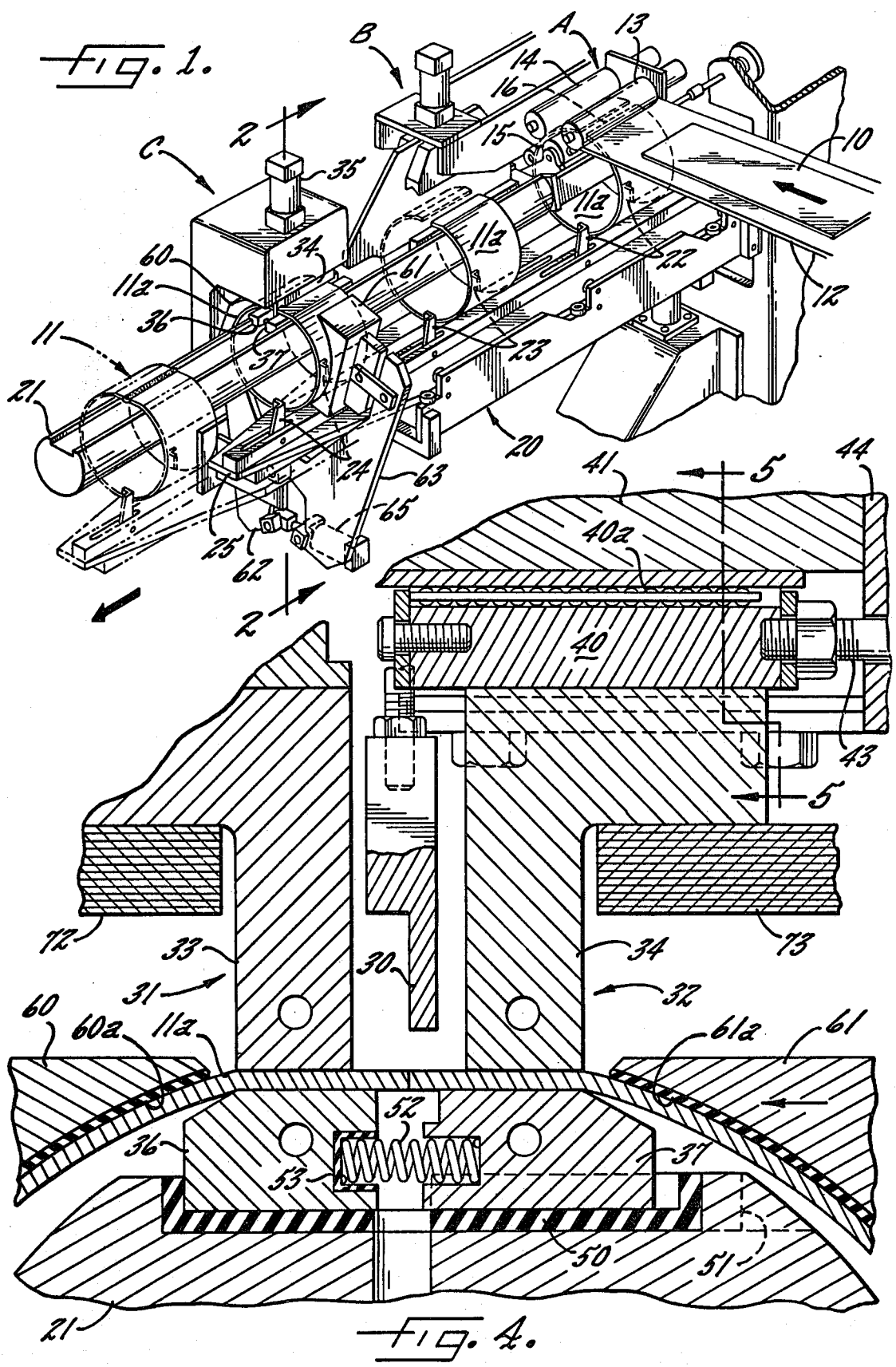

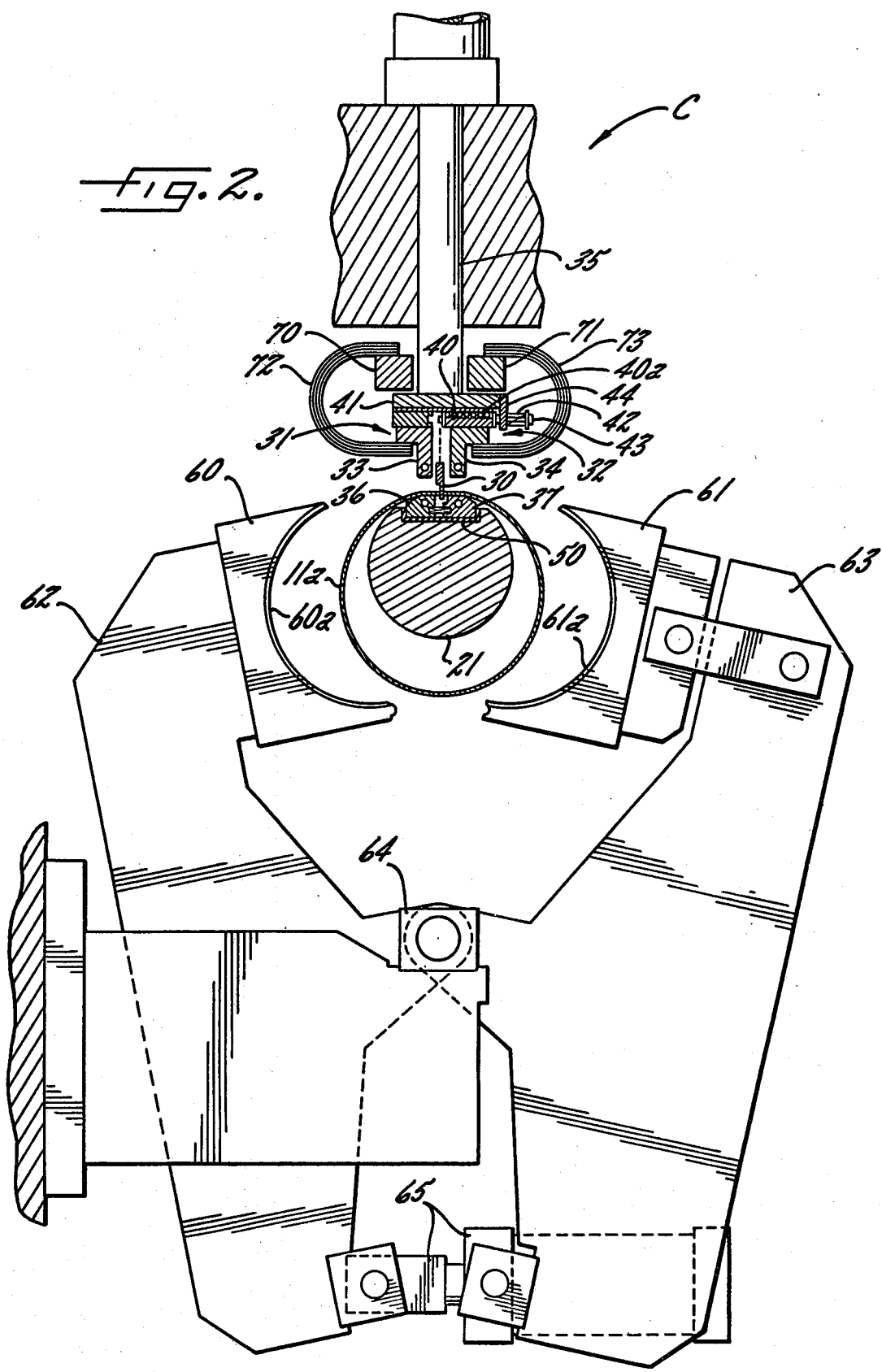

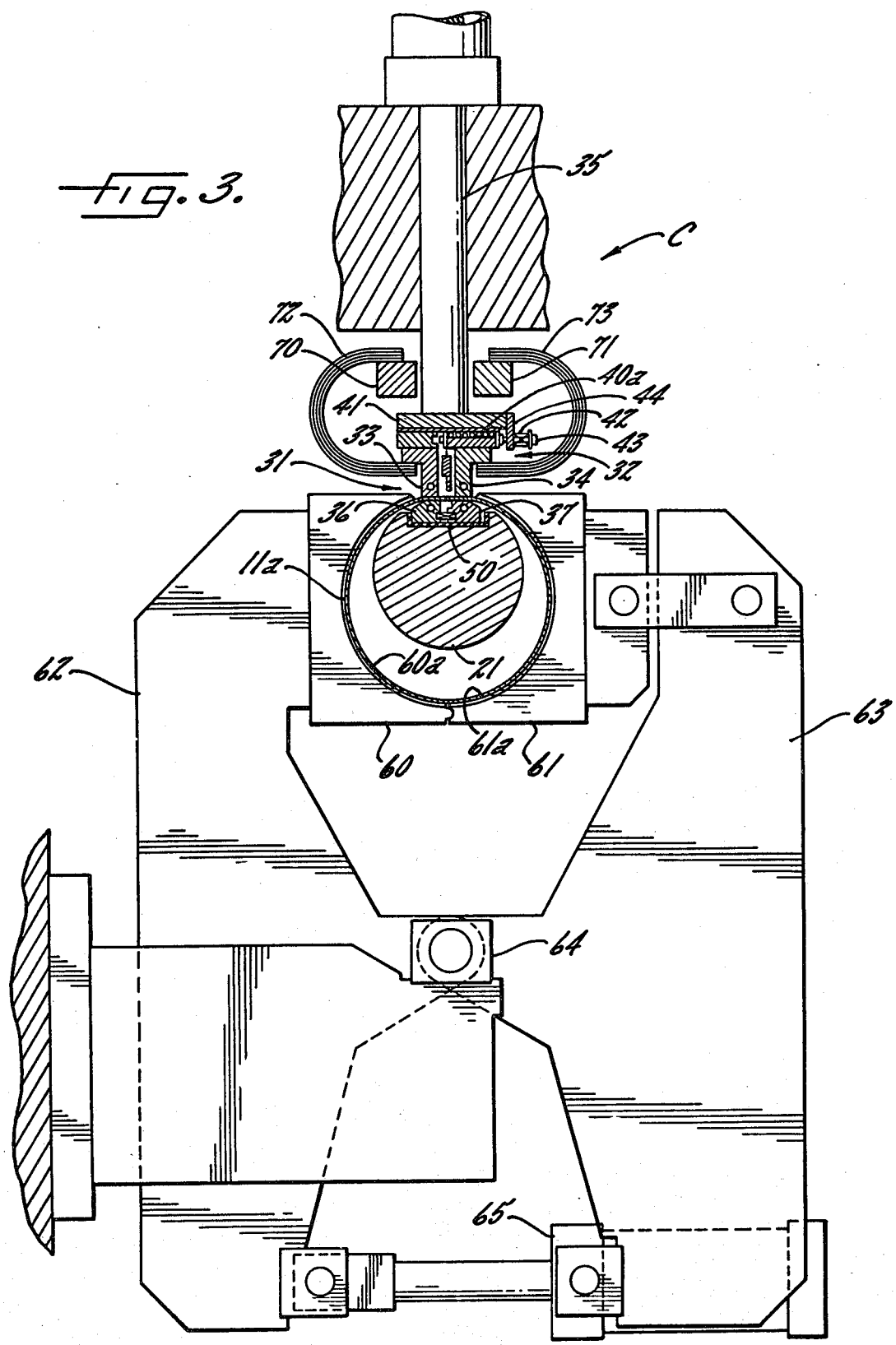

MACHINE FOR WELDING SEAMS IN AUTOMOTIVE WHEEL RIM BLANKS

CROSS REFERENCE TO RELATED APPLICATION

This application is a continuation-in-part of application Ser. No. 722,428 now abandoned, filed Sept. 13, 1976, and entitled "Machine For Welding Seams In Automotive Wheel Rim Blanks".

DESCRIPTION OF THE INVENTION

The present invention relates generally to welding machines and, more particularly, to machines for welding the longitudinal seams in automotive wheel rim blanks.

It is a principal object of the present invention to provide an improved welding machine for welding the longitudinal seams in automotive wheel blanks, which machine facilitates orientation of the rim blanks with the welding tools, thereby ensuring a high degree of reliability in the production of satisfactory welds over a large number of rim blanks.

Another object of the invention is to provide an improved welding machine of the foregoing type which consistently produces high quality welds.

It is a further object of the invention to provide such an improved welding machine in which the only sliding movement of the tooling occurs on bearings, with no sliding movement between the tooling and the rim blanks, thereby providing a long wearing life for the tooling.

Still another object of the invention is to provide such an improved welding machine which ensures reliable input of the welding current to the weld zone of the rim blanks.

Yet another object of the invention is to provide such an improved welding machine which permits the use of d-c. welding current to form the desired welds at fast production rates.

A still further object of the invention is to provide such an improved welding machine which is capable of welding the longitudinal seams in the rim blanks while the blanks are supported on an elongated horn extending through a series of work stations. In this connection, a related object of the invention is to provide such a welding machine which avoids non-uniform welding current distribution throughout the weld area of the wheel rim blanks during the welding operation, even when the supporting horn bends.

Other objects and advantages of the invention will be apparent from the following detailed description and the accompanying drawings, in which:

FIG. 1 is a perspective view of a wheel rim blank forming system including a welding machine embodying the present invention;

FIG. 2 is an enlarged section taken along line 2-2 in FIG. 1, showing the positions of the various tools just after a rim blank first enters the welding machine;

FIG. 3 is the same sectional view shown in FIG. 2 but showing the tools in the positions occupied during a welding operation;

FIG. 4 is an enlarged fragmentary view of the weld zone and the tooling associated therewith in the positions illustrated in FIG. 3;

Figure 6A:
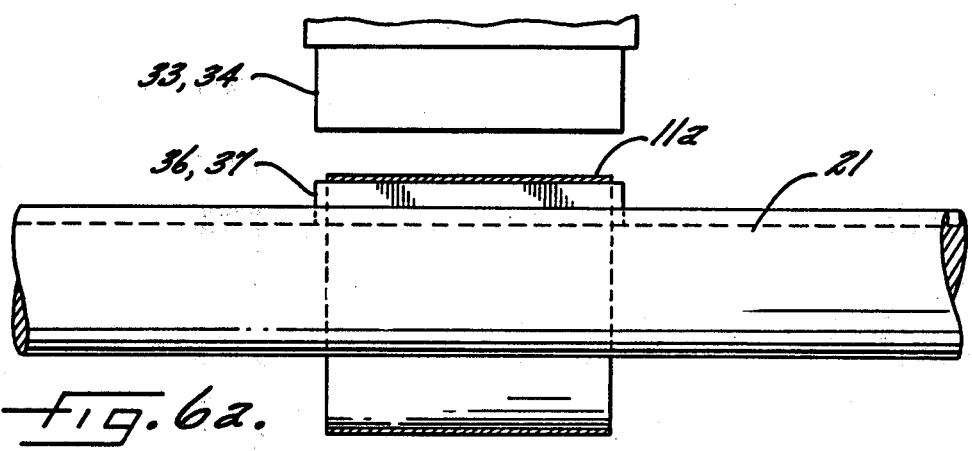
Figure 6B:
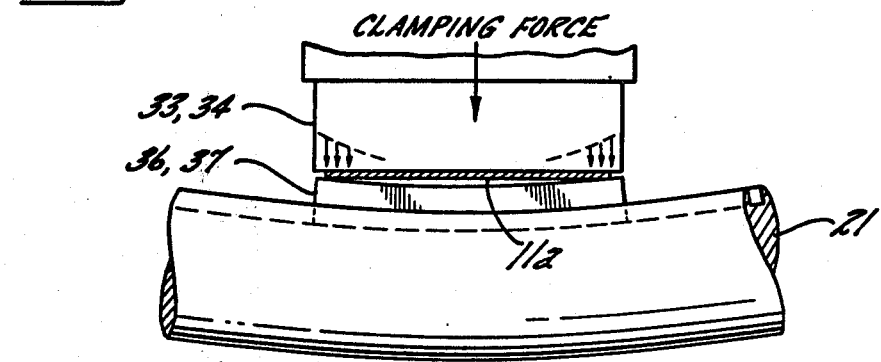
Figure 6C:
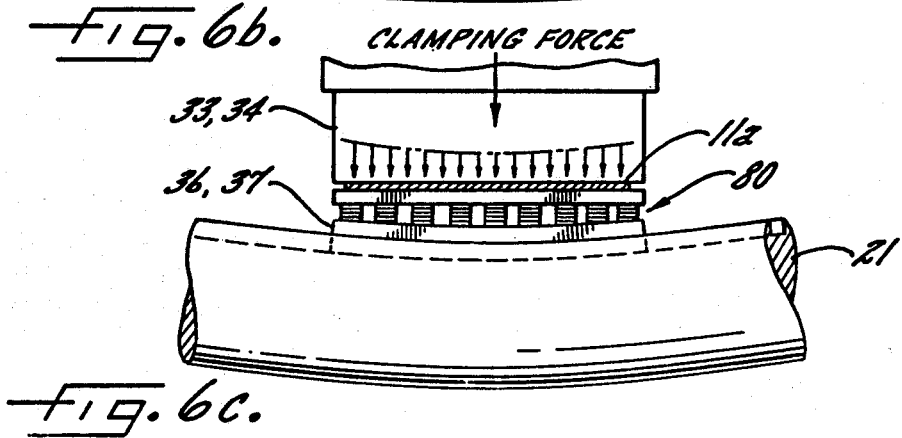

FIGS. 6a, 6b and 6c are side elevation views illustrating the relative positions of the rim blank, the clamping assemblies and the supporting horn in the welding station (1) with the horn in a perfectly horizontal position without any bend (FIG. 6a), (2) with the supporting horn subjected to an exaggerated longitudinal bend without any means of compensating for the bend (FIG. 6b), and (3) with the horn subjected to an exaggerated longitudinal bend with biasing means provided in the clamping assemblies to compensate for the bend.

Figure 7:
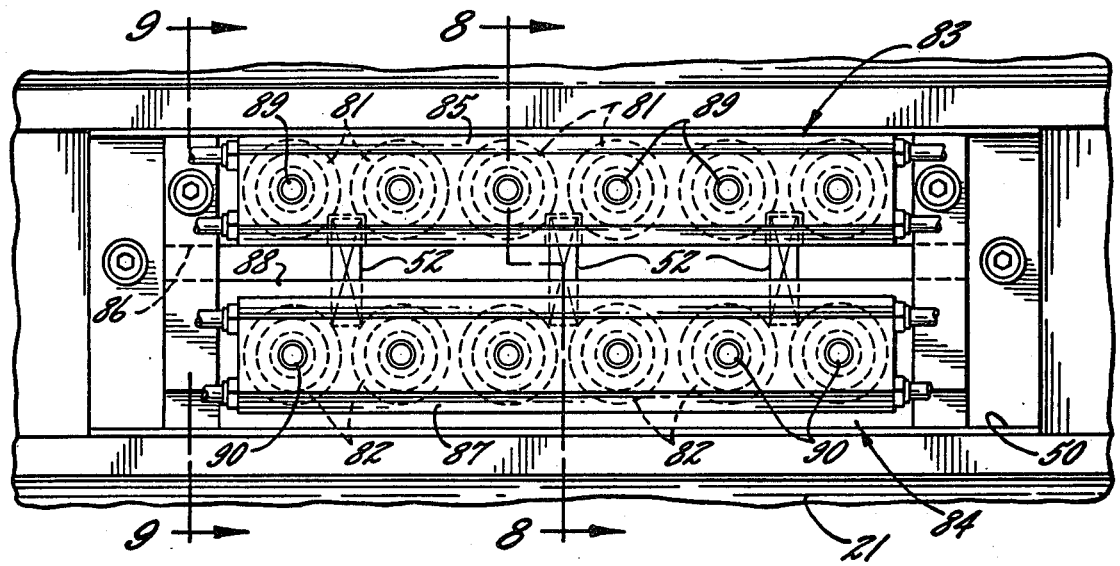
Figure 8:
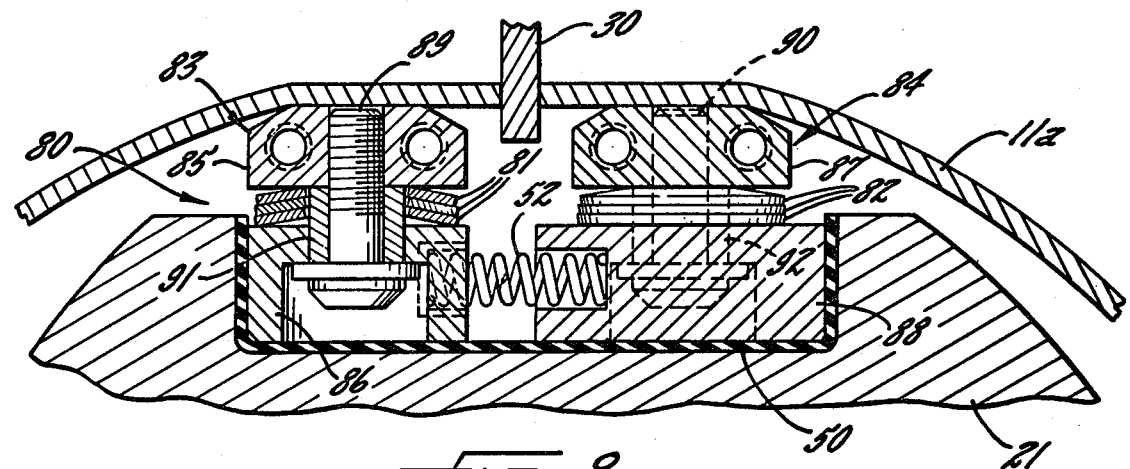
Figure 9:
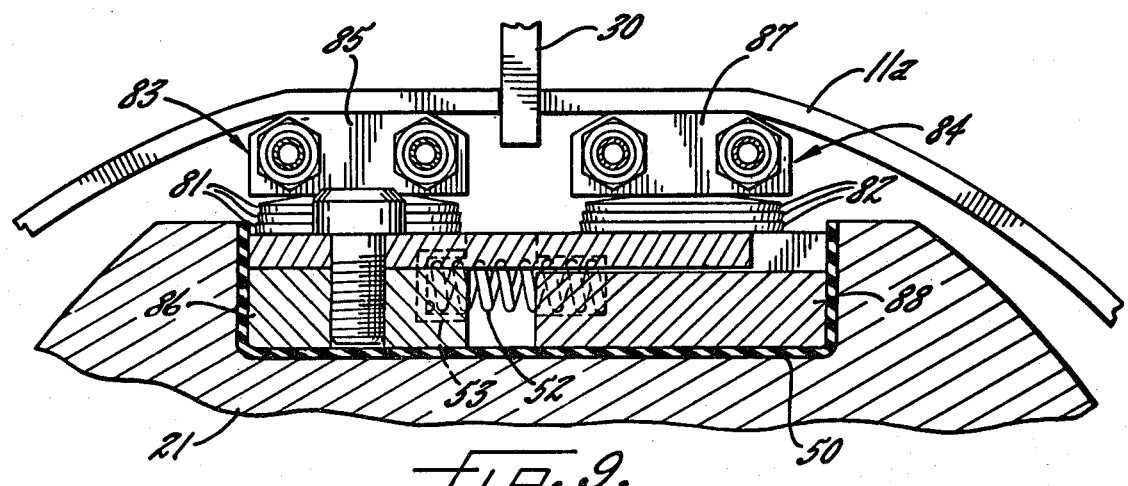
Figure 10:
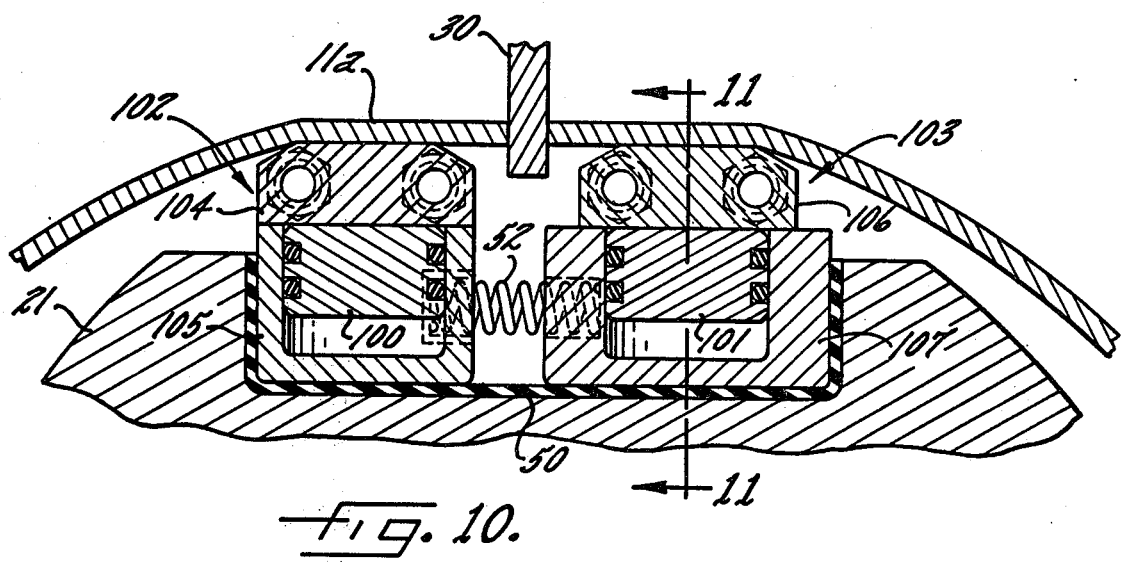
Figure 11:
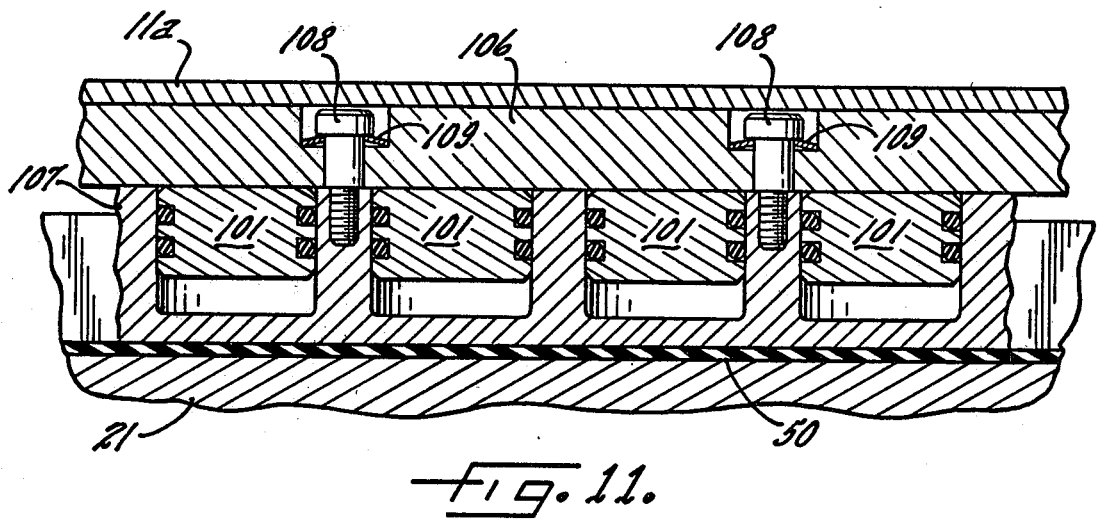

FIG. 7 is a top plan view of the inside clamping members provided with one particular embodiment of the compensating biasing means illustrated in FIG. 6c;

FIG. 8 is an enlarged section taken generally along line 8—8 in FIG. 7, showing one of the biasing means in an expanded position;

FIG. 9 is an enlarged section taken generally along line 9—9 in FIG. 7 showing both biasing means in their compressed positions;

FIG. 10 is a section similar to FIG. 9 but showing an alternative embodiment of the compensating biasing means; and FIG. 11 is a section taken generally along line 11—11 in FIG. 10.

Although the invention will be described in connection with a certain preferred embodiment, it will be understood that it is not intended to limit the invention to that particular embodiment. On the contrary, it is intended to cover all alternatives, modifications, and equivalents that may be included within the spirit and scope of the invention as defined by the appended claims.

Turning now to the drawings and referring first to FIG. 1, there is shown a completely automatic machine for converting flat metal blanks 10 into cylindrical rim blanks 11 having longitudinal welded seams where the edges of the flat blanks are brought together to form the cylinder. The flat blanks 10 that are fed into the machine are pre-cut to exactly the size required to form rim blanks having a preselected diameter and axial length. The flat blanks 10 are fed into the machine along a feed table 12 leading into a coiling station A where the flat blank 10 is coiled to form a cylindrical blank 11a.

As described in more detail in the assignee's Hess et al. U.S. Pat. No. 3,934,324, issued Jan. 27, 1976 for "Method And Apparatus For Forming Automotive Wheel Rim Blanks", the coiling station A includes a conventional pyramid type coiling arrangement comprising three primary rolls 13, 14 and 15 working on the blank. The two upper rolls 13 and 14 press the incoming blank 10 downwardly against the lower roll 15 with the bottom surface of the second upper roll 15 extending below the level of the feed table 12 so that it bends or coils the metal blank downwardly around the lower roll 15. This coiling action is continued until the leading edge 16 of the blank engages a stop on the inboard edge of the feed table 12, thereby forming a cylindrical rim blank 11a with an open longitudinal gap between the two longitudinal edges of the blank.

An end conditioning press B is located adjacent the coiling station A so that the coiled blanks 11a can be transferred directly from the coiling station to the press in the direction of the axis of the coiled blanks. The purpose of the end conditioning press is to make the longitudinal edge portions of the coiled blank symmetrical and bring them into precise alignment with each other to ensure the production of a good weld seam. An inherent result of the coiling operation is the production of asymmetrical longitudinal edge portions, i.e., a slight bend or kink is formed near the leading edge of the blank, and the trailing end has an increasing radius of curvature. The end conditioning press removes these irregularities and produces perfectly symmetrical longitudinal edge portions so as to facilitate the subsequent welding and finishing thereof. The particular end conditioning press to be described herein is designed to flatten the longitudinal edge portions of the coiled blank, but it will be understood that the press could be designed to form other symmetrical shapes compatible with the particular welding and finishing equipment employed. The details of the illustrative end conditioning press are described in more detail in the aforementioned U.S. Pat. No. 3,934,324.

After a blank has been end conditioned by the press B, the blank is again transferred in the direction of its axis to an adjacent welding station C where the longitudinal edge portions of the coiled blank are butt welded. The unloading of the coiled blanks from the coiling station A, the loading and unloading of blanks to and from the end conditioning press B, and the loading and unloading of the welding station C are all effected simultaneously by an automatic transfer mechanism 20 which grips the bottom portions of the three coiled blanks simultaneously and transfers them from one station to the next. The blanks are continuously supported by an elongated support horn 21 which extends continuously from the coiling station A through the end conditioning press B and the welding station C. The transfer mechanism 20 is also described in detail in the aforementioned U.S. Pat. No. 3,934,324. Basically, the transfer mechanism comprises three sets of clamps 22, 23 and 24 which grip opposite ends of the coiled blanks at the coiling station A, the end conditioning press B, and the welding station C, respectively, and a shuttle 25 which moves the three sets of jaws back and forth between the respective work stations. The transfer mechanism 20 is also adjustable in both the longitudinal and vertical directions to accommodate blanks of different axial lengths and/or different diameters.

In order to align the rim blanks 11a with the tooling in the welding station C as the blanks enter that station a gap bar 30 enters the longitudinal gap at the top of each rim blank 11a (see FIG. 2). After the rim blank has come to rest in the weld station, the gap bar 30 is retracted vertically from the rim blank and elevated a slight distance above the top surface of the blank, as illustrated in FIGS. 3 and 4. The gap bar remains in this elevated position during the welding operation, and then is subsequently lowered again when the next rim blank 11a is transferred from the press B to the welding station C. This vertical movement of the gap bar 30 is effected by a small hydraulic cylinder which is not shown in the drawings.

In accordance with one aspect of the present invention, the welding station is provided with a pair of clamping assemblies each including an inside member and an outside member for engaging the inner and outer surfaces, respectively, of each rim blank adjacent the longitudinal edges thereof on opposite sides of the longitudinal gap for aligning the longitudinal edges with each other before they are pressed together and welded. Thus, in the illustrative embodiment, the cylindrical rim blank 11a is gripped by a pair of clamping assemblies 31 and 32 having outside clamping members 33 and 34 mounted on the lower end of a hydraulic cylinder rod 35. When the hydraulic cylinder rod 35 is advanced, the outside clamping members 33 and 34 are lowered against the flattened edge portions of the rim blank, pressing the blank downwardly against a pair of inside clamping members 36 and 37 mounted on the horn. As can be seen in FIG. 1, both the inside and outside clamping members extend continuously along the full length of the rim blank, and each of the inside and outside clamping members is provided with a longitudinal bore through which a suitable cooling medium may be passed during operation of the machine.

Figure 5:
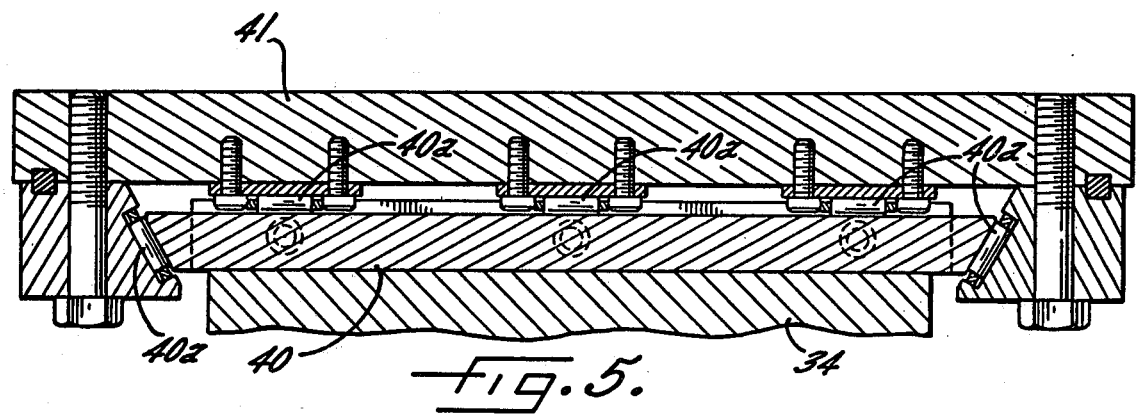
FIG. 5 is a section taken along line 5—5 in FIG. 4.

As another important feature of the invention, at least one of the clamping assemblies is movable relative to the other clamping assembly in a direction transverse to the longitudinal gap so as to permit the longitudinal edges of the rim blank to be pressed against each other while the blank is clamped on both sides of the gap. Thus, in the illustrative embodiment, the clamping assembly 32 is mounted for sliding horizontal movement toward and away from the stationary clamping assembly 31 in a direction perpendicular to the longitudinal edges of the rim blank. More specifically, the outside clamping member 34 is affixed to a slide member 40 which is mounted for sliding transverse movement within a head assembly 41 carried on the end of the hydraulic cylinder rod 35. As shown most clearly in FIG. 5, the slide member 40 is dovetailed within the head assembly 41 with the top surface and both side surfaces of the slide member 40 riding on a plurality of roller bearings 40a to permit the slide member 40 to move freely back and forth within the head assembly 41 along a path perpendicular to the longitudinal edges of the rim blank. The slide member 40 is normally urged away from the stationary clamping assembly 31 by means of a spring 42 (see FIG. 2) mounted on a rod 43 (see FIG. 4) which is threaded into the slide member 40. This spring 42 biases the slide member 40 toward a stop bar 44 affixed to and depending from the side of the head assembly 41. Thus, the stop bar 44 limits the movement of the outside clamping member 34 away from the stationary clamping member 33.

To permit sliding transverse movement of the inside clamping member 37, it is mounted on a bearing plate 50 recesse within the top of the horn 21. A key 51 holds the movable inside clamping member 37 against longitudinal movement on the bearing plate 50. The movable inside bearing member 37 is normally urged to its retracted position (illustrated in FIG. 2) by means of a series of compressed coil springs 52 disposed between the two inside clamping members 36 and 37 so as to bias the member 37 away from the stationary member 36. Each of the springs 52 is surrounded by an insulating cap 53 to prevent the electric welding current from flowing through these inside clamping members 36 and 37, and the bearing plate 50 is formed of an electrically insulating material for the same purpose.

Thus, it can be seen that even while the rim blank 11a is clamped on both sides of the longitudinal gap by the two clamping assemblies 31 and 32, the longitudinal edges of the rim blank can still be moved toward each other by moving the entire clamping assembly 32. The outside clamping member 34 rides on the roller bearings 40a while the inside clamping member rides on the bearing plate 50, so there is no relative movement between the clamping members and the rim blank. Consequently, there is relatively little wear on the clamping assembly. This relative movement of the two clamping assemblies 31 and 32 is important to permit the longitudinal edges of the rim blank to be pressed against each other both prior to and during the welding operation, but after the longitudinal edges of the rim blank have been perfectly aligned with each other by clamping them in the two aligned clamping assemblies 31 and 32.

In order to press the longitudinal edges of the rim blank 11a together in the transverse direction to close the longitudinal gap therebetween, and to hold the longitudinal edges of the rim blank together during the welding operation, the entire cylindrical rim blank 11a is gripped between two complemenatry jaws 60 and 61. These jaws 60 and 61 are carried on the upper ends of a pair of heavy arms 62 and 63 which are pivoted near the centers thereof on a frame member 64 and actuated by a hydraulic cylinder 65 connected to the lower ends thereof. Consequently, when the hydraulic cylinder is advanced, the resulting pivotal movement of the arm 62 and 63 cause the jaws 60 and 61 to move inwardly against opposite sides of the rim blank 11a, thereby forcing the opposed longitudinal edges of the rim blank firmly against each other. The open position of the jaws 60 and 61, with the hydraulic cylinder 65 retracted, is illustrated in FIG. 2, while the advanced position of the jaws, with the hydraulic cylinder 65 advanced, is illustrated in FIG. 3. The jaws are maintained in the closed portion throughout the welding operation so that the longitudinal edges of the rim blank are continuously pressed against each other. As metal is upset from the longitudinal edges of the blank during the welding operation, the edges are continually advanced toward each other due to the sliding movement of the clamping assembly 32 in response to the transverse clamping pressure applied to the rim blank by the closed jaws 60 and 61.

In accordance with yet another important aspect of the present invention, the electric welding current is supplied to the opposed longitudinal edges of the rim blank through the clamping assemblies so that the welding current flows perpendicularly through the elongated weld zone. This avoids the critical alignment problem encountered in some prior art welding systems in which the welding current is supplied to the rim blank through an electrode that is independent of the tooling responsible for holding or positioning the rim blank. Thus, the illustrative embodiment of the invention, the welding current is supplied from a source (not shown) to a pair of bus bars 70 and 71 which extend along the full length of the rim blank and are mounted on top of the head assembly. From the bus bars 70 and 71, the welding current flows through a pair of flexible arcuate conductors 72 and 73 to the outside clamping members 33 and 34, respectively. The welding current thus enters the rim blank through the bottom surface of one of the outside clamping members 33 and 34, which extend along the full length of the rim blank. The current then flows perpendicularly through the weld zone defined by the abutting longitudinal edges of the rim blank, forming a butt weld between the two longitudinal edges by fusing the two edges together. This particular welding system is particularly suitable for use with a d-c. welding current which forms the desired welds very quickly, achieving high production rates.

In accordance with a further feature of the invention, biasing means urge the inside clamping members against the rim blank to assure relatively uniform contact pressure between the blank and the outside clamping members in the event that the supporting horn bends. As illustrated in FIG. 6a, the horn 21 ideally remains perfectly horizontal so that both the inside clamping members 36 and 37 and the rim blank 11a also remain perfectly level. However, because of the relatively long unsupported span of the horn 21, it tends to bend under clamping force, as illustrated to an exaggerated degree in FIG. 6b. Of course, when the horn 21 bends, the inside clamping members 36 and 37, being attached to the horn, also bend, thereby causing very high contact pressures near the edges and very low or no contact pressure in the middle of the rim blank with resultant deleterious effects on the weld. In actual practice, this vertical deformation may be only a few thousands of an inch, but nevertheless it can have a serious adverse effect on the resulting weld. Consequently, as illustrated in FIG. 6c, one embodiment of the present invention provides inside clamping members which are split horizontally and provided with a plurality of biasing elements 80 spaced along the length of each of the inside clamping members for urging such members toward the rim blank and the opposed outside clamping members.

In the particular embodiment illustrated in FIGS. 7-9, the biasing elements 80 take the form of bellville springs 81 and 82 disposed between the upper and lower segments of two split inside clamping members 83 and 84. More specifically, the clamping member 83 comprises an upper segment 85 and a lower segment 86, and the other clamping member 84 comprises an upper segment 87 and a lower segment 88. The upper segments 85 and 87 are held captive on the lower segments by two series of bolts 89 and 90 which are threaded into the upper segments 85 and 87 while remaining free for limited vertical movement relative to the lower segments 86 and 88 within complementary cavities formed in the lower surfaces of these bottom segments. Bearing sleeves 91 and 92 are disposed between the inside surfaces of the bellville springs 81 and the outside surfaces of the bolts 88 and 89, respectively.

As illustrated in FIG. 6c and FIG. 8, the bellville springs 81 on each side of the location of greatest downward horn deflection will flex downwardly in response to a downward deflection of the horn 21, thereby compensating for the deflection of the horn and maintaining a substantially uniform pressure across the entire surface of the rim blank in the vicinity of the weld zone. At the ends of the horn, the bellville springs 81 will flex sufficiently to assure approximately uniform clamping force between the rim blank and the outside clamping members 33 and 34, as illustrated in FIG. 9.

In the embodiment of FIGS. 10 and 11, the biasing elements 80 take the form of a series of hydraulic pistons 100 and 101 spaced along the length of a pair of split inside clamping members 102 and 103. More specifically, the clamping member 102 comprises an upper segment 104 and a lower segment 105, while the member 103 comprises an upper segment 106 and a lower segment 107. As can be seen in FIG. 11, the upper and lower segments of each split clamping member are held together by a series of screws 108 threaded into the lower segment, with the head of each screw 108 resting on a bellville washer 109 and recessed within a cavity in the upper segment to permit limited vertical movement of the upper segment relative to the lower segment. In the event of a downward defelection of the horn 21, the resulting reduction in pressure on the top of the clamping member causes one or more of the hydraulic pistons 100 and/or 101 to move upwardly to maintain a uniform pressure across the entire surface of the rim blank in the vicinity of the weld zone, in the same manner as the bellville springs utilized in the embodiment of FIGS. 7-9.

As a further feature of the preferred embodiment of the invention, the surfaces of the jaws 60 and 61 that engage the workpiece are covered with an electrically insulating material to prevent power losses due to flow of the welding current from the workpiece into the jaws. Although the pressure applied to the workpiece by the jaws 60 and 61 is sufficiently small that the current flow per unit area is quite small, the total area of the jaw faces is so large that the cumulative power losses can be substantial without an insulating interface. Thus, in the illustrative embodiment, the gripping surfaces of the jaws 60 and 61 are covered with insulating liners 60a and 61a which are securely fastened to the metal bodies of the jaws. Consequently, any electrical current that enters the workpiece on one side of the longitudinal gap simply flows through the workpiece and back to the electrode on the opposite side of the gap, and the only power loss is through electrical heating of the workpiece.

As can be seen from the foregoing detailed description, this invention provides an improved welding machine which facilitates orientation of the rim blanks with the welding tools, including the electrodes for supplying the electric welding current to the workpiece, thereby ensuring a high degree of reliability in the production of satisfactory welds over a large number of rim blanks. The electric welding current is supplied to the weld zone simultaneously along the entire length of the weld zone and perpendicular to the weld line. Consequently, this improved welding machine consistently produces high quality welds. Furthermore, the tooling in the welding machine has a long wearing life because the only sliding movement of the tooling occurs on bearings, with no sliding movement between the tooling and the rim blank as is encountered in certain prior art welding machines. Moreover, those embodiments of the invention which utilize split inside clamping members with biasing elements disposed therein further ensure the consistent production of high quality welds by avoiding bending of the rim blanks during the welding operation, even in the face of vertical deflection of the supporting horn.

We claim as our invention:

1. A welding machine for welding the longitudinal seams in wheel rim blanks which have been rolled into cylinders with the longitudinal edges of each blank forming the weld zone for said longitudinal seam, said machine comprising the combination of a pair of clamping assemblies each including an inside member and an outside member for engaging the inner and outer surfaces, respectively, of the rim blank adjacent the longitudinal edges thereof on opposite sides of said weld zone so as to align said longitudinal edges with each other, at least one of said clamping assemblies being movable relative to the other clamping assembly in a direction transverse to said weld zone so as to permit the longitudinal edges of the rim blank to be pressed against each other while the blank is clamped on both sides of said weld zone, means for urging said inside and outside members of said clamping assemblies against the respective inner and outer surfaces of the rim blank, said movable clamping assembly including bearing means supporting both the inner and outer clamping members to permit sliding movement of said clamping members on said bearing means without any relative movement between said clamping members and the rim blank clamped therebetween, means independent of said clamping assemblies for engaging the outside surface of the rim blank on opposite sides of said weld zone and pressing the longitudinal edges of the rim blank together in the transverse direction to press said longitudinal edges of the rim blank together during the welding thereof, and means for passing an electric welding current through said clamping assemblies and transversely through the longitudinal edges of the rim blank to effect the welding of said longitudinal edges while said edges are continuously pressed together and while the rim blank is continuously clamped on both sides of said weld zone to maintain said edges in alignment with each other.

2. A welding machine as set forth in claim 1 wherein said outside clamping members extend continuously along the full length of the rim blank, and including means for supplying the electric welding current to the rim blank through said outside clamping members so that the welding current flows perpendicularly through the longitudinal edges of the rim blank.

3. A welding machine as set forth in claim 2 which includes a source of d-c. welding current.

4. A welding machine as set forth in claim 1 which includes means for supplying the electric welding current to the rim blank through said clamping assemblies.

5. A welding machine as set forth in claim 4 which includes a pair of stationary bus bars for conducting electric welding current from a voltage source, and a pair of flexible conductors connnecting said bus bars to the outside clamping members.

6. A welding machine as set forth in claim 1 wherein at least one of said inside clamping members is mounted for sliding movement toward and away from the other inside clamping member, and including biasing means for urging the inside clamping members away from each other, and stop means for limiting relative movement of the inside clamping members away from each other.

7. A welding machine as set forth in claim 1 wherein at least one of said outside clamping members is mounted for sliding movement toward and away from the other outside clamping member, and including biasing means for urging each movable outside clamping member away from the other outside clamping member, and stop means for limiting relative movement of the outside clamping members away from each other.

8. A welding machine as set forth in claim 1 which includes an elongated horn for supporting the rim blank and the inside members of said clamping assemblies, and biasing means for urging said inside clamping members against the rim blank to assure relatively uniform contact pressure between the rim blank and the outside clamping members in the event of bending of said horn.

9. A welding machine as set forth in claim 7 wherein said biasing means comprises a plurality of spring means spaced along the length of each of the inside clamping members for urging said inside clamping members toward the outside clamping members thereby applying relatively uniform pressure against the outside clamping members so as to provide a uniform distribution of welding current and heating of the weld zone.

10. A welding machine as set forth in claim 7 wherein said biasing means comprises a plurality of hydraulic cylinders spaced along the length of each of the inside clamping members for urging said inside clamping members toward the outside clamping members.

11. A welding machine as set forth in claim 1 which includes drive means for advancing and retracting said outside clamping members relative to the inside clamping members for clamping the rim blank therebetween.

12. A welding machine as set forth in claim 1 which includes a longitudinal gap bar for aligning the longitudinal gap in each rim blank with said clamping assemblies before clamping the rim blank.

13. A welding machine as set forth in claim 1 wherein said pressing means comprises a pair of cooperating metal jaws for engaging opposite sides of the exterior surface of the workpiece and pressing the opposed longitudinal edges thereof together, the surfaces of said jaws that engage the workpiece being covered with an electrically insulating material to prevent power losses due to flow of welding current from the workpiece into said jaws.

14. A welding machine for welding the longitudinal seams in wheel rim blanks which have been rolled into cylinders with the longitudinal edges of each blank forming a longitudinal gap, said machine comprising the combination of
   (a) a pair of clamping assemblies each including an inside member and an outside member for engaging the inner and outer surfaces, respectively, of the rim blank adjacent the longitudinal edges thereof on opposite sides of said longitudinal gap so as to align said longitudinal edges with each other,
   (b) an elongated horn and means for supporting the rim blank and the inside members of said clamping assemblies while permitting transverse movement of said inside clamping members relative to said horn,
   (c) and a plurality of biasing means disposed along the length of said horn between the horn and the inside clamping members for urging said inside clamping members against the rim blank toward said outside clamping members to assure relatively uniform contact pressure between the rim blank and the said outside clamping members in the event of bending of said horn.

15. A welding machine as set forth in claim 14 wherein said biasing means comprises a plurality of spring means spaced along the length of each of the inside clamping members for urging said inside clamping members toward the outside clamping members.

16. A welding machine as set forth in claim 14 wherein said biasing means comprises a plurality of hydraulic cylinders spaced along the length of each of the inside clamping members for urging said inside clamping members toward the outside clamping members.

* * * * *